United States Patent
Inouye

[19]

[11] Patent Number: 6,003,890

[45] Date of Patent: Dec. 21, 1999

[54] STEERING STOP FOR BICYCLE FORK SUSPENSION SYSTEM

[75] Inventor: Matthew D. Inouye, San Mateo, Calif.

[73] Assignee: Rockshox, Inc., San Jose, Calif.

[21] Appl. No.: 09/141,793

[22] Filed: Aug. 28, 1998

Related U.S. Application Data

[60] Provisional application No. 60/058,443, Sep. 10, 1997.

[51] Int. Cl.[6] .................................................. B62K 21/02
[52] U.S. Cl. ...................................... 280/270; 280/288.4
[58] Field of Search ................................... 280/270, 271, 280/272, 288.4

[56] References Cited

U.S. PATENT DOCUMENTS

| | | | |
|---|---|---|---|
| 227,746 | 5/1880 | Pancher | 280/271 |
| 565,718 | 8/1896 | Boardman | 280/271 |
| 582,279 | 5/1897 | Gold | 280/271 |
| 4,138,131 | 2/1979 | Sommer | 280/271 |
| 4,433,852 | 2/1984 | Hon | 280/278 |
| 4,887,827 | 12/1989 | Heggie | 280/271 |

FOREIGN PATENT DOCUMENTS

| | | |
|---|---|---|
| 892722 | 7/1949 | Germany . |
| 84612 | 3/1957 | Netherlands . |

*Primary Examiner*—Lanna Mai
*Assistant Examiner*—Andrew J. Fischer
*Attorney, Agent, or Firm*—Skadden, Arps, Slate, Meagher & Flom LLP; David W. Hansen

[57] ABSTRACT

A fork stop assembly for preventing overrotation of a bicycle fork into engagement with the frame of the bicycle. The fork stop assembly includes at least one catch surface on the frame of the bicycle and a fork stop pin on the bicycle fork. Upon rotation of the fork beyond a predetermined position, the fork stop pin engages the catch surface and further rotation of the bicycle fork is thereby prevented. Thus, the fork is prevented from crashing into the bicycle frame. The catch surface and fork stop pin are preferably formed such that they may be nonrotatably coupled to the respective parts of a bicycle manufactured without such a stop assembly. Most preferably, the fork stop assembly is removable from the bicycle without damaging the frame or bicycle fork or leaving any significant permanent marks thereon.

8 Claims, 6 Drawing Sheets

STEERING STOP FOR BICYCLE FORK SUSPENSION SYSTEM

CROSS-REFERENCE TO RELATED APPLICATION

The present application claims the benefit of the earlier filing date copending U.S. provisional patent application Ser. No. 60/058,443, filed Sep. 10, 1997, which is incorporated by reference herein in its entirety.

BACKGROUND OF THE INVENTION

The present invention relates to the design and construction of a steering or fork stop that limits the turn angle of a bicycle fork to prevent the fork from hitting the bicycle frame upon turning of the front wheel.

Suspension systems have been provided on bicycles to improve handling of the vehicle by absorbing shocks caused by roughness, discontinuities such as rocks, potholes, tree roots and other obstacles, and/or other variations in the vehicle's path that disturb smooth riding. Thus, disturbances in the road are absorbed by the suspension system and are minimally transmitted to the rider, thereby preventing, or at least greatly reducing, transmission of the disturbances to other parts of the vehicle. The rider thus is afforded better control of the bicycle without interference by disturbances in the riding path.

Bicycle suspension systems have been provided and positioned to absorb shocks affecting, for example, the front wheel of a bicycle. Front wheel suspension systems typically are provided in a specially designed front wheel fork having telescoping stanchions or fork tubes within which a shock absorber of the suspension system is positioned. The fork is thus formed with two (right and left) upper tubular elements and two (right and left) lower tubular elements. One of the upper and lower pairs is an inner tubular element pair and the other of the upper and lower pairs is an outer tubular element pair such that each leg of the fork has an inner tubular element slidable within an outer tubular element.

Various available suspension systems permit adjustability of suspension performance by adjustment of the spring rates. However, in order to achieve sufficient suspension performance in certain situations, structural modifications sometimes are necessary in addition to adjustments of spring rates and damping characteristics. For example, dual crown suspension forks have been designed for situations in which very stiff suspension structures and high damping capabilities are required, such as is true for bicycles used in downhill racing. In such a dual crown suspension system, the fork tubes may extend as far as the top of the head tube of the bicycle in order to provide sufficient structure for shock absorption.

A known disadvantage with certain bicycle forks, particular dual crown suspension forks, is that when the handlebars are turned during steering, at extreme turning angles the fork tubes can hit the bicycle frame. Such contact impacts the frame, sending vibrations therethrough interfering with a controlled steering of the bicycle. Moreover, even when the bicycle is not in use, such impacts may damage the frame and/or the suspension fork, or, at least, their finish. This is particularly likely to occur if the frame or suspension fork is made of a light-weight material which may not be able to endure side impacts without detrimentally affecting its structural integrity.

Steering stops or fork stops have been provided on motorcycle forks in order to prevent the fork tubes of the front fork from hitting the motorcycle frame. However, typical steering stop designs are integrated into the fork crown and motorcycle frame. A steering stop assembly has been provided in a downhill bicycle fork design by FOES RACING™ in the form of a fork stop comprising a bolt threaded into the fork crown and a semicircular catch surface bolted onto the head tube of the bicycle frame. Because, among other things, the FOES RACING™ steering stop is integrated into the lower crown of the FOES™ fork, the FOES™ steering stop assembly cannot be applied to bicycles other than those using the FOES™ Fork.

SUMMARY OF THE INVENTION

It therefore is an object of the present invention to provide a steering stop for a bicycle fork suspension system that limits the turn angle of the fork and thereby prevents the fork tubes from hitting the bicycle frame.

It is a related object of the present invention to provide a steering stop that is detachably mountable to a preexisting bicycle suspension fork or bicycle frame without requiring pre-existing mounting elements on the frame for receiving a steering stop assembly, such that the steering stop may be applied to a variety of suspension systems or other frame elements that would be benefitted thereby.

In accordance with the principles of the present invention, a fork stop assembly is provided for preventing the tubes of a front fork, preferably a suspension fork, of a bicycle from hitting the frame of the bicycle. Preferably, the fork stop assembly includes a fork stop catch fixed to a portion of the bicycle frame and a fork stop that is rotatable with the fork. Rotation of the fork stop, and hence the fork, is limited by catch surfaces on the fork stop catch. The present fork assembly preferably may be formed as a bolt-on model, sold separate from the suspension fork yet attachable thereto without the need for mounting elements previously provided on the suspension fork. Thus, the principles of the invention are not limited to application during the formation of a bicycle but may also be applied to preexisting bicycles not provided with such a stop assembly.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

In accordance with the principles of the present invention, a fork stop assembly 10, 110, 210, 310, such as shown in FIGS. 1 and 5–7, is provided in order to impede rotation of the fork assembly 12 of a bicycle, and particularly of upper stanchions 13, into contact with the frame 14 of the bicycle. Although the fork stop assembly 10, 110, 210, 310 of the present invention is described herein as positioned on a suspension fork assembly 12 of a high performance suspension bicycle, it will be understood that the inventive fork stop assembly 10, 110, 210, 310 may be applied on a standard, non-suspension fork of any type of bicycle, or on the suspension fork of a motorcycle, or on another such wheeled vehicle having an element whose rotation may cause undesired impact against a frame portion.

Figure 1:
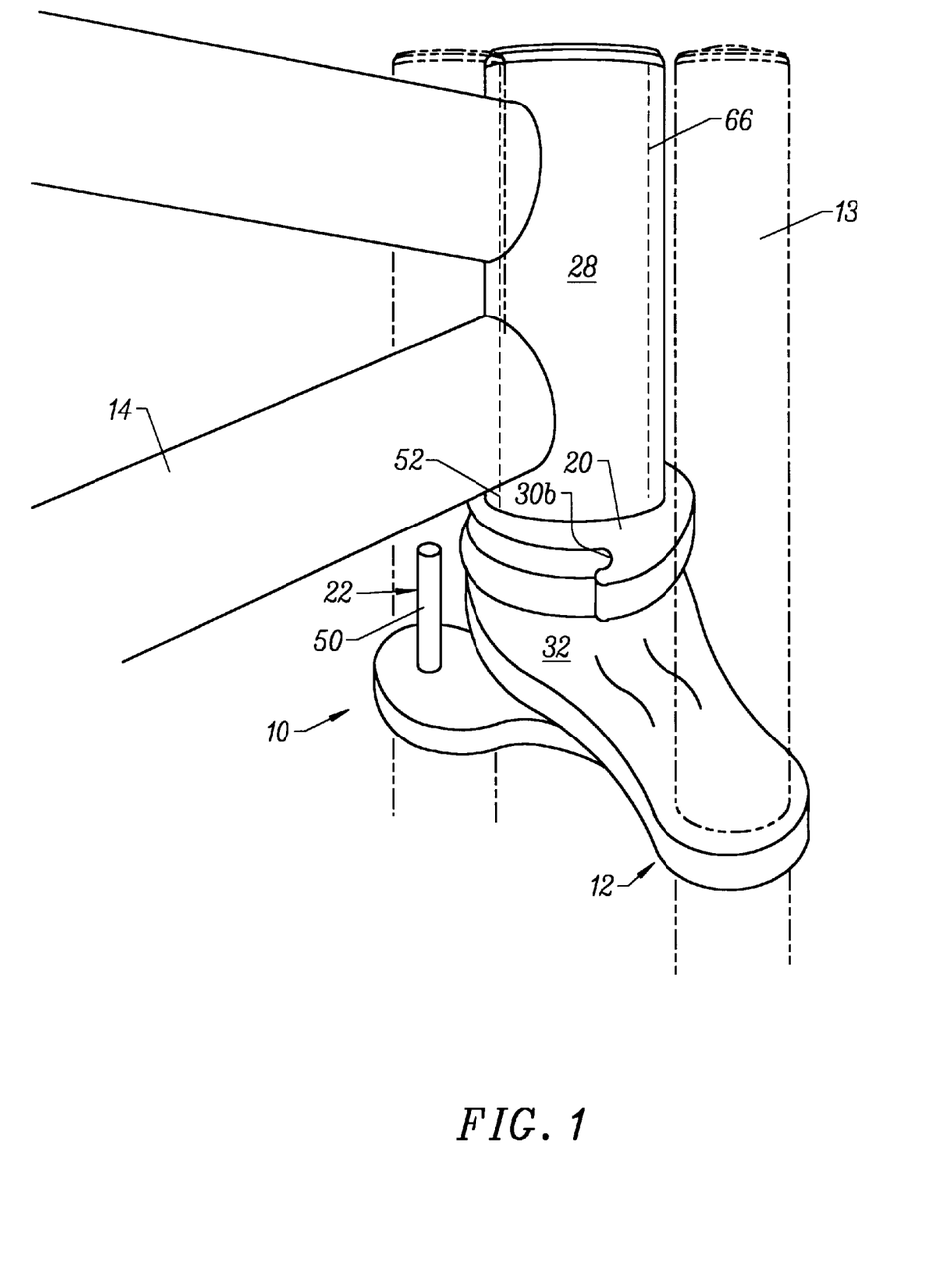
FIG. 1 is a partial perspective view of a front, upper section a bicycle frame having a fork stop assembly coupled thereto in accordance with the principles of the present invention.

As shown in FIGS. 1 and 5–7, the fork stop assembly 10, 110, 210, 310 of the present invention includes a fork stop catch 20, 110, 210, 310 and a fork stop 22, 122, 222, 322. All parts of the fork stop assembly 10 of FIG. 1 are readily attachable (and detachable, if desired) from a preexisting bicycle frame 14, without the need for any special features on the bicycle frame 14 for accommodating the connection of a fork stop assembly 10 thereto. Thus, the fork stop assembly 10 of the present invention may be applied to any bicycle frame 14 and fork 12 that otherwise may impact each other during steering.

Figure 2:
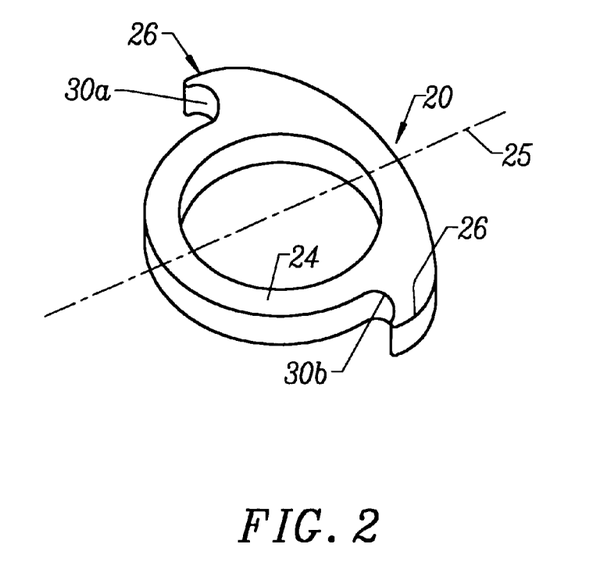
FIG. 2 is a perspective view of a fork stop catch of the fork stop assembly of the present invention.
Figure 3:
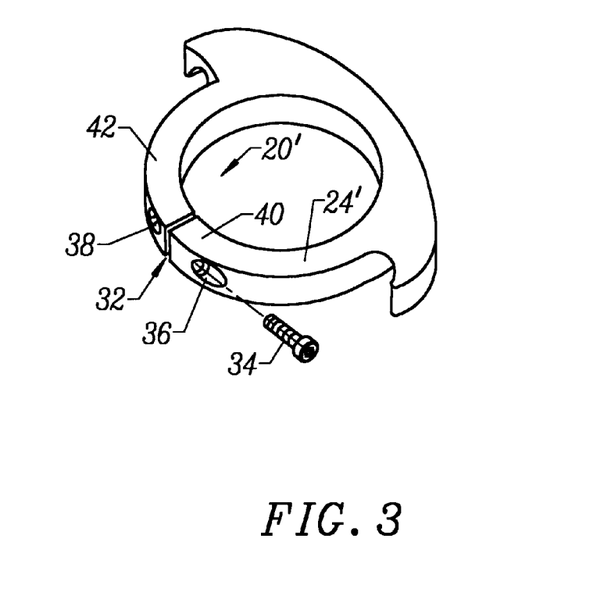
FIG. 3 is a perspective view of a fork stop catch similar to that of FIG. 2 but formed for an alternative mode of attachment to a bicycle frame.

The fork stop catch 20, shown in isolation in FIGS. 2 and 3, includes a connection portion 24 and a catch portion 26. The connection portion 24 permits coupling of the fork stop catch 10 to the desired bicycle frame element at the desired location. Preferably, the connection portion 24 is shaped to substantially conform to the shape of the frame element to which the connection element is to be coupled. Although other shapes may be used, the connection portion 24 of the embodiment of FIGS. 2 and 3 is substantially round so that it may be positioned over the mating surface of the head tube 28 shown in FIG. 1.

The catch portion 26 preferably includes a catch surface 30a, 30b on either side of the connection portion 24, and, hence, on either side of the frame 14. The position of catch surfaces 30a, 30b prevents extended rotation of bicycle fork 12 in either direction beyond a set position so that stanchion tubes 13 do not contact bicycle frame 14, as will be explained in greater detail below. As shown in FIGS. 2 and 3, catch surfaces 30a, 30b may be positioned symmetrically about an axis 25 of the connection portion. However, it will be appreciated that the location of the catch surfaces 30a, 30b along the connection element 24 may be determined by the specific bicycle frame and fork with which the fork stop assembly 10 is to be used.

The shape of the catch surface 30a, 30b is selected and designed to provide optimal catching of the rotatable element of the fork stop assembly described in greater detail below. For example, if a cylindrical stop pin 50 is provided on the rotatable portion, then the catch surface may be rounded, as shown in the embodiment of FIGS. 1–3. The catch surface 30a, 30b thus may securely catch and hold the stop pin 50 and thereby prevent further rotation of the fork stop 22 (the rotatable element) of the fork stop assembly 10 and the bicycle element 28 to which the fork stop 22 is attached.

The connection portion 24 of the fork stop catch 20 is fixedly attached to a portion of the frame 28 or 14 of a bicycle such that the connection portion 24 does not rotate during steering of the bicycle. Although the connection portion 24 may be attached to any similarly fixed portion of frame 14, it preferably is attached to the head tube 28 of the bicycle frame 14, adjacent the fork assembly 12, particularly the crown 32 of the fork 12. Such attachment may be achieved by brazing, welding, bolting, bonding, using an interference or press-fit or by any method known to those skilled in the art that provides firm securement.

The fork stop catch 20 of FIG. 1 is a braze-on type and is shown in isolation in FIG. 2. As may be seen in FIG. 2, the braze-on fork stop catch 20 has a ring-shaped connection portion 24 that is a unitary piece that must be passed over and secured to a substantially round cylindrical frame element such as head tube 28, as shown in FIG. 1. Connection is achieved by using any desired securing method, typically selected based on the material of the frame 14 and the material of the fork stop catch 20. Because the lightest weight materials are typically used in bicycles, the securing method must be such as to avoid damaging these relatively delicate materials. Moreover, the securing method should also permit the fork stop catch 20 to be attached without significantly compromising the integrity of the frame 14 and to be removed without leaving a significant impact on the frame 14.

In order to simplify attachment of the fork stop catch 20 to the frame 14 of a preexisting bicycle, as well as to permit detachment therefrom, fork stop catch 20' may be formed, as shown in FIG. 3, to permit a detachable bolt-on connection to a bicycle frame in such a manner as to not affect (or at least minimally affect) the structure of the frame. In the embodiment of FIG. 3, the bolt-on fork stop catch 20' has an arcuate connection portion 24' with a split 32 therethrough to permit the connection portion 24' to be inserted either laterally or axially over a frame element such as head tube 28. A bolt 34 may be passed through bolt holes 36, 38 in respective adjacent unconnected ends 40, 42 of the connection portion 24, adjacent the split. The bolt 34, typically with the use of a nut or internal thread, may then bring together the unconnected ends 40, 42 to tighten the connection portion 24' to the frame. The bolt-on type fork stop catch 20' is generally preferred over the braze-on type, particularly where the frame is delicate and/or non-metallic (e.g., graphite) and therefore not suited to post-assembly welding or brazing operations. Moreover, with respect to any type of frame, such a connection allows for removal of the fork stop catch 20' without leaving a hole or any significant mark on the frame where the fork stop catch 20' had been connected.

The fork stop 22 of FIGS. 1 and 4 comprises at least one stop pin or stop dowel 50 positioned to be engaged by the above-described catch surfaces 30a, 30b. Rotational movement of stop pin 50 with respect to head tube 28 causes stop pin 50 to eventually engage a concave curved catch surface 30a, 30b. In particular, rotation of fork assembly 12 beyond a predetermined position would cause stanchions 13 to contact frame 14. Catch surfaces 30a and 30b and stop pin 50 are positioned such that rotation of fork assembly 12 to the right beyond the predetermined position causes stop pin 50 to contact left catch surface 30a and thus inhibit further rotation of fork assembly 12 to the right. Likewise, rotation of fork assembly 12 to the left beyond a predetermined position causes stop pin 50 to contact right catch surface 30b and thus inhibit further rotation of fork assembly 12 to the left. Preferably stop pin 50 is fitted in a base 54 in a manner (e.g., threading, bolting, or press-fitting) that permits the pin 50 to be replaced by the user if necessary.

The fork stop 22 of FIG. 1 is in the form of a bolt-on or add-on fork stop that may be coupled to a preexisting bicycle fork 12 having no attachment elements previously provided for connection of a fork stop thereto. The fork stop 22 of FIG. 1 thus includes a fork stop base 54 to which stop pin 50 and attachment elements 56 (such as those shown in FIG. 4) are removably affixed. The base 54 permits secure coupling of fork stop 22 to the fork 12 (or other movable element) of the bicycle. It will be understood that attachment elements 56 shown in FIG. 4 are exemplary and may be replaced with any other means for attaching an element carrying a stop pin 50 to a portion of bicycle fork 12 (or other rotatable frame element that has the potential of hitting and damaging another frame element).

Figure 4A:
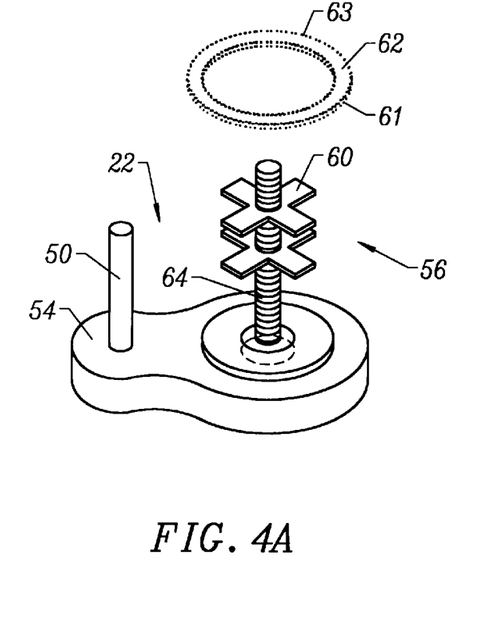
FIGS. 4a–d are perspective exploded views of various attachment element embodiments for attaching an add-on fork stop of the fork stop assembly of the present invention to a bicycle frame.

FIGS. 4a–d illustrate some of the possible methods for attaching fork stop 22 to fork assembly 12 and frame 14. The exemplary attachment elements of FIG. 4a include a star-fangled nut 60, a lock washer 62, and a bolt 64. The star-fangled nut 60 may be installed through the bottom of the fork crown 32 and preferably is attached to the interior surface of the steerer tube 66 (shown in phantom in FIG. 1) within the head tube 28. The lock washer 62 is assembled between the fork crown 32 and the bolt-on fork stop base 54. Preferably, the bolt-on fork stop 22 is coupled to the bottom of the lower fork crown 32 when applied to a dual crown fork 12. Once base 54 is positioned on the fork 12, the stop pin 50 should be capable of being stopped by the catch surface 30a, 30b of the fork stop catch 20 or 20' on the bicycle head tube 28. The bolt 64 is passed through the fork stop base 54 and the lock washer 62, threaded through the star-fangled nut 60 and tightened. The bolt-on fork stop 22 is thereby attached to the fork crown 32 and steerer tube 66 in head tube 28. When bolt 64 is sufficiently tightened, lock-washer 62 prevents bolt-on fork stop 22 from rotating by providing the necessary frictional forces to inhibit rotation of the fork stop base 54 relative to steerer tube 66 and crown 32, particularly upon impact of stop pin 50 with fork stop catch surfaces 30a, 30b. An exemplary, preferred lock washer 62 is serrated along its top and bottom surfaces 61, 63 to provide the desired engagement, as shown in FIG. 4a.

Figure 4B:
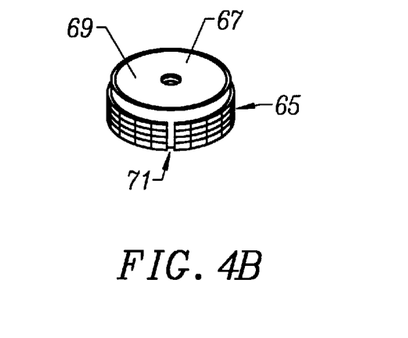

Another preferred method of attaching fork stop 22 is shown in FIG. 4b, which illustrates an attachment device comprising an expanding sleeve 65 and a wedge 67 which may be used in place of the star-fangled nut 60 of FIG. 4a. Expanding sleeve 65 may be made from any flexible material, and preferably has a cut 71 to facilitate its radial expansion. Expanding sleeve 65 preferably has a textured exterior surface to enhance engagement with a mating part such as the interior surface of steerer tube 66. The interior mating surface of expanding sleeve 65 and the exterior mating surface of wedge 67 preferably are tapered so that pressure applied to a first side 69 of wedge 67 will result in expansion of expanding sleeve 65 when bolt 64 is tightened. Once bolt 64 has been tightened, lock washer 63 prevents fork stop 22 from rotating by providing the necessary frictional resistance to such movement.

Figure 4C:
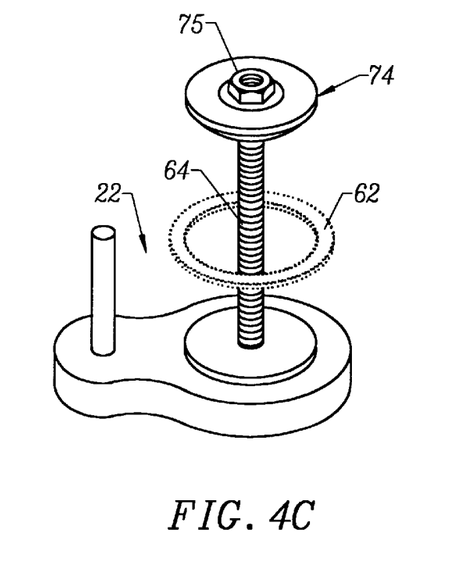

Yet another alternative attachment method is shown in FIG. 4c, comprising a steerer cap 74, bolt 64, and a nut 75, which may substituted for star-fangled nut 60. Steerer cap 74 is designed to be matingly positioned at the top of steerer tube 66. Threadably tightening nut 75 onto bolt 64 attaches steerer cap 74, lock washer 62 and fork stop 22 to fork crown 32 and steerer tube 66 in head tube 28.

Figure 4D:
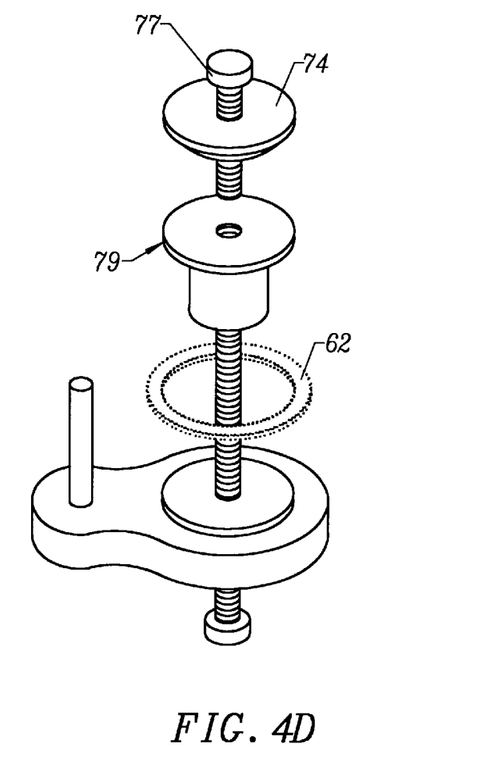

As shown in FIG. 4d, another attachment method comprises a modified steerer cap 79, which threads directly onto bolt 64. Modified steerer cap 79 may also attach stem cap 74 and bolt cap 77, which are commonly used for assembly of AHEADSET™-style stems, headsets and steerers. A lock washer 62 may also be used. By providing the necessary frictional resistance to rotation, the attachment devices of FIGS. 4a–d prevent fork stop base 54 from rotating relative to steerer tube 66 and crown 32, particularly upon impact of stop pin 50 with fork stop catch surfaces 30a, 30b. Of course, as persons having skill in this art will recognize, any other attachment mechanisms that effectively attach fork stop 22 to steerer tube 66 or frame 14 such that fork stop 22 is prevented from rotating relative to steerer tube 66 will be useful in connection with the other aspects of the present invention.

Figure 5:
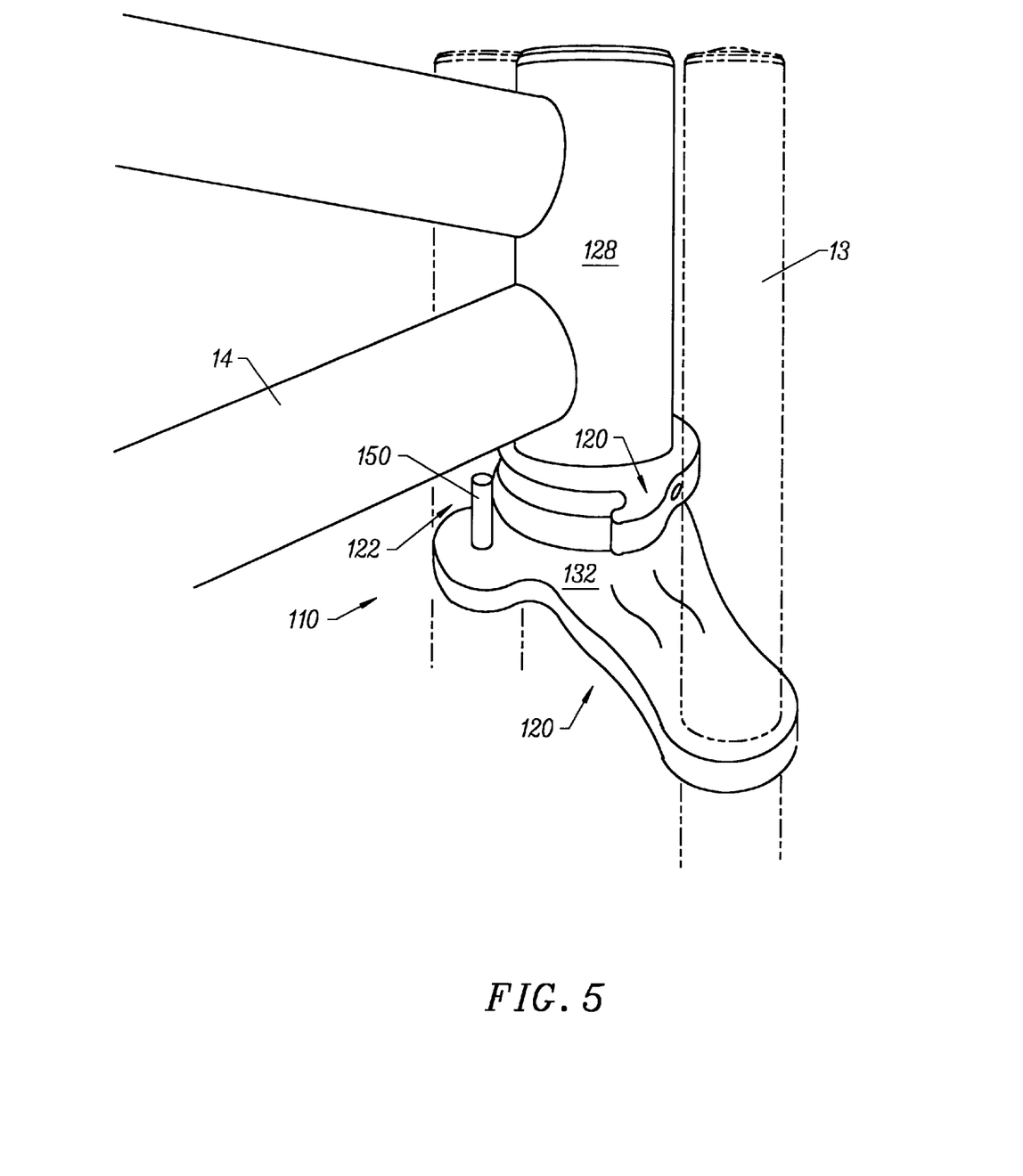
FIG. 5 is a view similar to that of FIG. 1, but showing a fork stop assembly formed as a part of the frame and fork in accordance with the principles of the present invention.

As described, a particularly unique feature of the fork stop 22 described above is that it is designed to be attached to any preexisting bicycle frame and fork that does not have a fork stop device. To the inventor's knowledge, this has not been thought of or accomplished in the past, and provides significant benefits, as previously explained. Those having skill in the art will recognize, however, that the unique design of the attachable fork stop 22 of the present invention may also be directly incorporated into a frame and fork during manufacture. A bicycle or at least a bicycle fork 120 thus may be purchased with a fork stop assembly 110 (or a portion thereof, in the case of a bicycle fork) already provided thereon, as shown in FIG. 5. In this embodiment, the fork stop 122 is an integral part of the crown 132, with the stop pin 150 extending upwardly from the top of the crown. As in the previously described embodiment, the stop pin 150 preferably is replaceable. The fork stop catch 120 may also be an integral part of the head tube 128. For example, the head tube 128 may be molded or otherwise formed with a fork catch stop 120 such that the fork stop and head tube are monolithic. Alternatively, the fork stop catch 120 may be a separate piece, as in FIGS. 2 and 3, that is brazed, welded, bolted, or otherwise attached to the head tube 128, as in the embodiment of FIG. 1.

Figure 6:
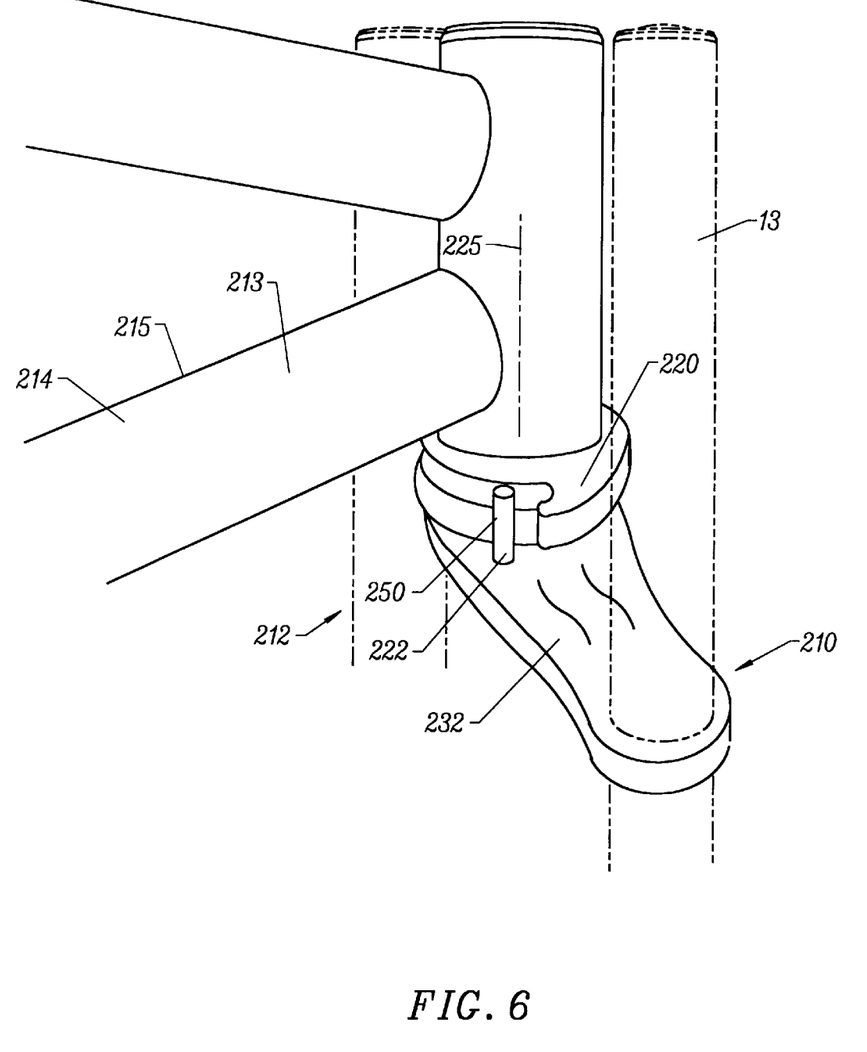
FIG. 6 is a view similar to that of FIG. 5, but showing the provision of two fork stop pins.

Although the above-described fork stop assemblies 10, 110 are provided with a single stop pin 50, 150, it will be appreciated that two stop pins 250 may be provided instead, one on each side of the crown 232. An exemplary double pin fork stop 222 is shown in FIG. 6. As may be seen, the position of the stop pin 250 has been somewhat modified from the position of the pins 50, 150 shown in FIGS. 1, 4, and 5 so that a respective right and left stop pin 250 may be provided for preventing impact of the fork 212 with the right and left sides 213, 215 of the frame, respectively. Although only the right stop pin 250 may be seen in FIG. 6, it will be understood that the left stop pin is substantially a mirror image of the right stop pin, symmetrically placed about a vertical axis 225 of the fork stop catch 220. As with the above-described stop pins 50, 150, the stop pins 250 of the double pin fork stop 222 preferably are replaceable as desired or necessary. It will be appreciated that the fork stop base of a double pin fork stop 222 may be integrated with the crown 232, as shown in FIG. 6, or formed as an add-on piece, similar to the fork stop bases of FIGS. 1 and 4.

Figure 7:
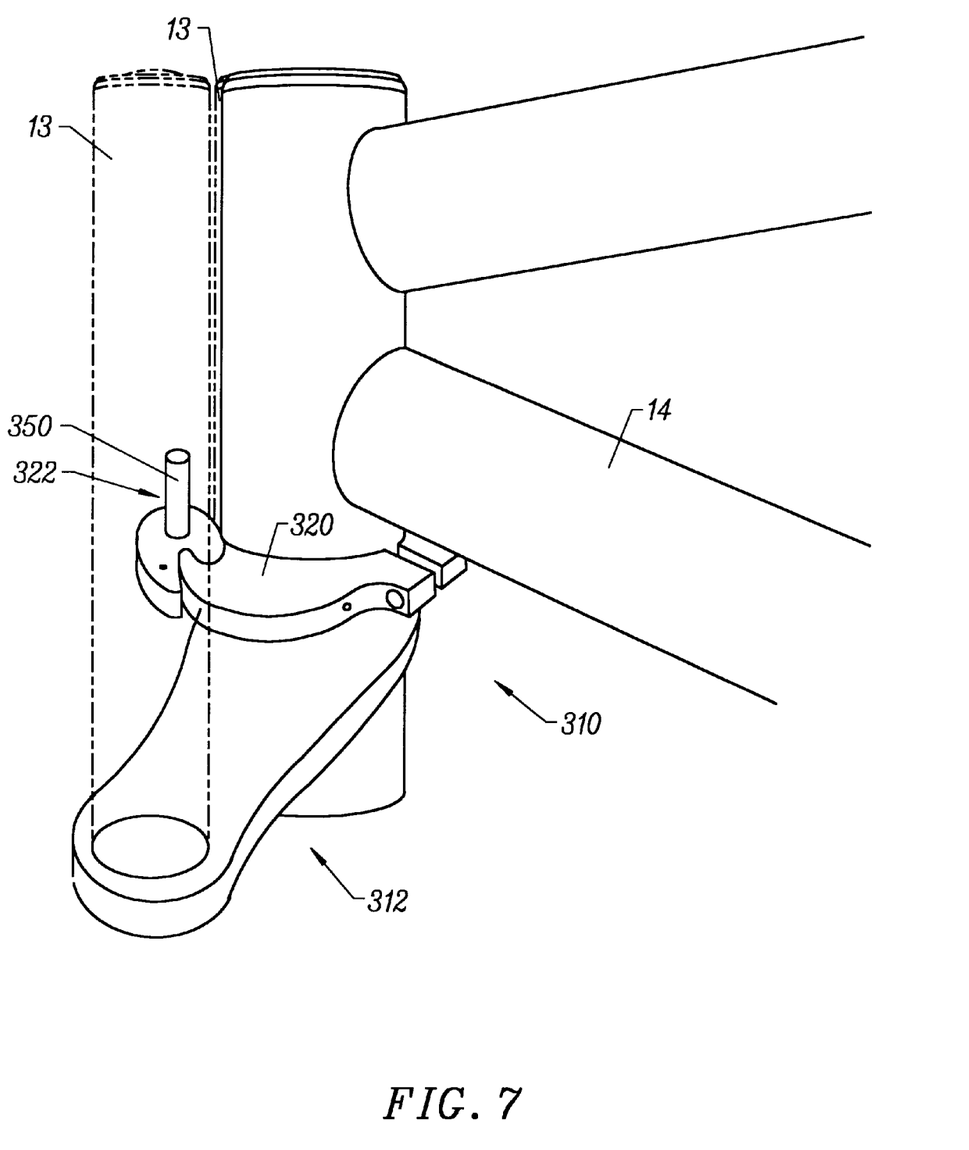
FIG. 7 is a view similar to that of FIG. 1, but showing the fork stop assembly in a reversed orientation and utilizing a fork stop catch such as shown in FIG. 3.

Another modification of the designs described thus far is shown in FIG. 7. Instead of positioning the stop pin rearwardly of the fork stop catch, the fork stop pin 350 of the embodiment of FIG. 7 is positioned forward of the fork stop catch 320. The shape of the fork stop catch 320 is thus modified to inhibit excessive rotation (which would result in the fork hitting the bicycle frame) upon a predetermined amount of rearward movement of fork stop pin 350. For example, fork stop catch 320 of FIG. 7 is forwardly concavely curved to catch and thereby prevent further rearward movement of the fork stop pin. It will be understood that although the fork stop assembly 310 of FIG. 7 is shown as a bolt-on assembly, the modified fork stop catch 320 and stop pin 350 orientation may be applied to any of the fork stop assemblies described herein.

While the foregoing description and drawings represent the preferred embodiments of the present invention, it will be understood that various additions, modifications and substitutions may be made therein without departing from the spirit and scope of the present invention. It will be clear to those skilled in the art that the present invention may be embodied in other specific forms, structures, arrangements, proportions, and with other elements, materials, and components, without departing from the spirit or essential characteristics thereof. For example, although the present invention has been described as applied to a dual crown suspension fork, the present invention may, instead, be implemented on any type of fork, whether or not a suspension system is provided therewith. Additionally, the fork stop catch and the fork stop may be positioned on any other two parts of a bicycle or other vehicle frame that are moveable with respect to each other but which should be prevented from contacting each other. The presently disclosed embodiments are therefore to be considered in all respects as illustrative and not restrictive, the scope of the invention being indicated by the appended claims, and not limited to the foregoing description.

What is claimed is:

1. A fork stop assembly for inhibiting relative movement between a bicycle fork and a bicycle frame movable with respect to each other, said fork stop assembly comprising:

a bicycle fork rotatably coupled to a head tube, said head tube being fixedly connected to the bicycle frame;

a fork stop catch including a connection portion nonrotatably coupled to the head tube of the bicycle frame, and a right catch surface and a left catch surface extending from opposite sides of said connection portion; and a fork stop having a stop pin fixedly coupled to said bicycle fork and spaced from said fork stop catch whereby rotation of the bicycle fork beyond a predetermined position causes the stop pin to contact the respective catch surface and thus inhibit further rotation of the bicycle fork.

2. A stop assembly as in claim 1, wherein said connection portion is substantially ring-shaped to match the geometry of said head tube.

3. A stop assembly as in claim 1, wherein said connection portion is substantially arcuate and has first and second ends which are separated by a split and coupled together to thereby couple said connection portion to said head tube.

4. A stop assembly as in claim 1, wherein:

said catch surface includes a right catch surface and a left catch surface on respective right and left sides of said head tube; and said stop pin is positioned behind said catch surfaces such that rotation of said bicycle fork to the right beyond a predetermined position causes said stop pin to engage said left catch surface and prevent further rotation of said bicycle fork to the right and rotation of said bicycle fork to the left beyond a predetermined position causes said stop pin to engage said right catch surface and prevent further rotation of the bicycle fork to the left.

5. A stop assembly as in claim 1, wherein:

said catch surface includes a right catch surface and a left catch surface on respective right and left sides of said head tube; and said stop pin is positioned forward of said catch surfaces such that rotation of said bicycle fork to the right beyond a predetermined position causes said stop pin to engage said right catch surface and prevent further rotation of said bicycle fork to the right and rotation of said bicycle fork to the left beyond a predetermined position causes said stop pin to engage said left catch surface and prevent further rotation of said bicycle fork to the left.

6. A stop assembly as in claim 1, wherein said stop pin is removably coupled to said bicycle fork such that said stop pin may be removed and replaced with another stop pin.

7. A stop assembly as in claim 1, wherein said stop pin is coupled to a crown of said bicycle fork.

8. A stop assembly as in claim 1, wherein said stop pin includes a right stop pin and a left stop pin on respective left and right sides of said bicycle fork.

\* \* \* \* \*